(12) United States Patent
Karthikeyan et al.

(10) Patent No.: US 8,028,188 B2
(45) Date of Patent: Sep. 27, 2011

(54) SYSTEM AND METHOD FOR TESTING AN APPLICATION INSTALLED ON A WIRELESS COMMUNICATION DEVICE

(75) Inventors: Balaji Dhanapal Karthikeyan, Bangalore (IN); Puneet Gupta, Bangalore (IN)

(73) Assignee: Infosys Technologies Limited (IN)

( * ) Notice: Subject to any disclaimer, the term of this patent is extended or adjusted under 35 U.S.C. 154(b) by 262 days.

(21) Appl. No.: 12/395,876

(22) Filed: Mar. 2, 2009

(65) Prior Publication Data

US 2009/0307531 A1 Dec. 10, 2009

(30) Foreign Application Priority Data

Mar. 4, 2008 (IN) .............................. 539/CHE/2008

(51) Int. Cl.
*G06F 11/00* (2006.01)
(52) U.S. Cl. ................................ 714/2; 714/27; 455/423
(58) Field of Classification Search ........................ None
See application file for complete search history.

(56) References Cited

U.S. PATENT DOCUMENTS

| | | | |
|---|---|---|---|
| 2003/0156549 A1* | 8/2003 | Binder et al. ................. | 370/252 |
| 2005/0090243 A1* | 4/2005 | El Husseini et al. .......... | 455/423 |
| 2006/0174162 A1* | 8/2006 | Varadarajan et al. ........... | 714/38 |
| 2006/0259629 A1* | 11/2006 | Usmani et al. ................ | 709/227 |
| 2006/0277231 A1* | 12/2006 | Kral et al. ..................... | 708/102 |
| 2007/0037521 A1* | 2/2007 | Babut et al. ................ | 455/67.11 |

* cited by examiner

*Primary Examiner* — Michael Maskulinski
(74) *Attorney, Agent, or Firm* — Lerner, David, Littenberg, Krumholz & Mentlik, LLP

(57) ABSTRACT

The invention describes a test bed, a method and a computer program product for testing an application installed on a wireless communication device. The wireless communication device communicates with a server over a network through the test bed. Further, the test bed is connected to the server and receives various testing parameters from a user. Furthermore, the test bed establishes a wireless connection between the test bed and the wireless communication device. Thereafter, the test bed emulates various network conditions, based on the testing parameters, and subsequently communicates the emulated network conditions to the wireless communication device. The application installed on the wireless communication device experiences the emulated network conditions. The user then tests the application in the emulated network conditions.

18 Claims, 6 Drawing Sheets

SYSTEM AND METHOD FOR TESTING AN APPLICATION INSTALLED ON A WIRELESS COMMUNICATION DEVICE

BACKGROUND OF THE INVENTION

The present invention relates to the field of testing a wireless communication device. More specifically, the present invention relates to a method and system for testing an application installed on a wireless communication device.

With the exponential growth of wireless technology, various applications are being developed for wireless communication devices. Examples of such wireless communication devices include Personal Digital Assistants (PDAs), mobile phones, laptops, computers, navigational devices, etc. There are various applications that run on wireless communication devices such as Internet browsers, applications that enable chatting, media players that stream live music through the Internet, etc. These applications are tested before they are launched in the market, to be used with wireless communication devices.

Presently, applications are tested by two common techniques. One of the techniques used for testing applications is known as 'Field Testing', wherein a tester installs an application on a wireless communication device and takes the wireless communication device in a 'live network'. Although the live network is similar to a real life scenario, the tester fails to test the application for a number of 'varying network conditions'. Further, the tester cannot control the network conditions and is therefore restricted to testing the application in the network conditions at the time of testing. For example, if the network conditions are strong on a given day, the tester may not be able to test the application during 'weak network coverage'. Therefore, testing does not guarantee the applicability of the application in varying network conditions. Furthermore, field testing is time-consuming and also an expensive way of testing the application.

Another technique employed for testing such an application is 'emulator-based testing'. An emulator is a computer that simulates various network conditions to test the application. Typically, in emulator-based testing, the application is installed on the emulator. Thereafter, the application is tested in various network conditions emulated by the emulator. Although emulator-based testing enables the tester to test the application in various network conditions, it has been observed that the application behaves abnormally once it is installed back in the wireless communication device. This occurs because the emulator fails to provide a hardware and software environment that is similar to the application provided by the wireless communication device.

In light of the above, there is a need for a system and method for testing the application installed on the wireless communication device. Further, the system should enable the tester to vary network conditions, to test the application thoroughly.

BRIEF SUMMARY OF THE INVENTION

An object of the invention is to provide a test-bed for testing an application installed on a wireless communication device.

Another object of the invention is to provide a test-bed to receive one or more testing parameters from a user.

Yet another object of the invention is to provide a test-bed capable of emulating different network conditions based on the one or more testing parameters and simultaneously communicating the emulated network conditions to the wireless communication device.

To achieve the objectives mentioned above, the invention provides a test-bed, a method and a computer program product for testing an application installed on a wireless communication device. The wireless communication device communicates with a server over a network through the test-bed. Further, the test-bed is connected with the server.

The test-bed receives one or more testing parameters from a user. The test-bed then establishes a wireless connection with the wireless communication device. Thereafter, one or more network conditions are emulated by the test-bed based on the one or more testing parameters. The one or more network conditions emulated by the test-bed are communicated to the wireless communication device over the network. The one or more emulated network conditions facilitate the user for testing the application.

The test-bed described above has a number of advantages. The test-bed enables the user to test the application installed on the wireless communication device. Further, since the application is installed on the wireless communication device, the application experiences hardware and software environment of the wireless communication device while testing. Hence, this eliminates the possibility of an abnormal behavior of the application once being installed on the wireless communication device after the 'emulator-based testing'.

Furthermore, the test-bed emulates various network conditions based on different testing parameters. A user testing the application can perform the test in various network conditions, thus resulting in a rigorous testing of the application. This eliminates the disadvantages experienced in the field testing.

BRIEF DESCRIPTION OF THE DRAWINGS

The various embodiments of the invention will hereinafter be described in conjunction with the appended drawings, provided to illustrate and not to limit the invention, wherein like designations denote like elements, and in which.

DETAILED DESCRIPTION

The invention describes a test-bed, a method and a computer program product for testing an application installed on a wireless communication device. The wireless communication device communicates with a server over a network through the test-bed. The test-bed is connected to the server and receives one or more testing parameters from a user. Further, the test-bed establishes a wireless connection with the wireless communication device, and thereafter, emulates one or more network conditions, based on the testing parameters. Subsequently, the test-bed communicates the emulated network conditions to the wireless communication device.

The application installed on the wireless communication device experiences the emulated network conditions. Thereafter, the user tests the application in the emulated network conditions.

Figure 1:
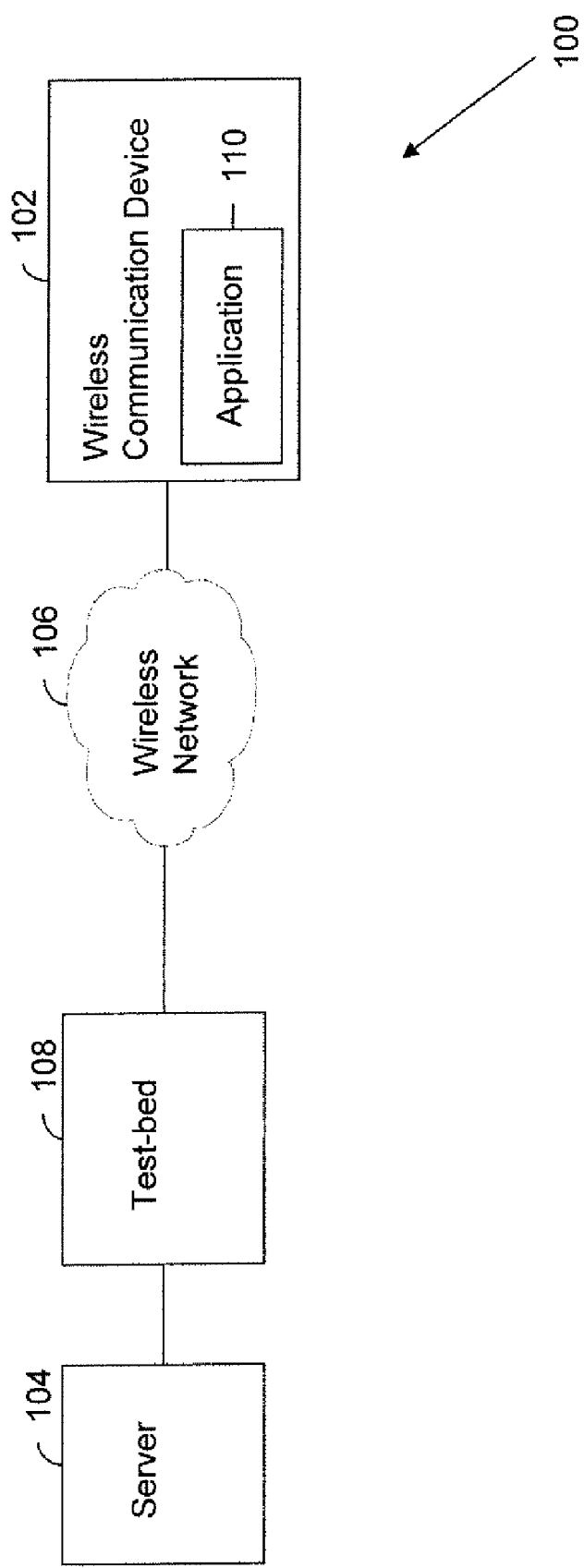
FIG. 1 illustrates an environment in which various embodiments of the invention may be practiced.

FIG. 1 illustrates an environment 100 in which various embodiments of the invention may be practiced. Environment 100 includes a wireless communication device 102, a server 104, a wireless network 106, a test-bed 108, and an application 110.

Wireless communication device 102 communicates with server 104 over wireless network 106, which is hereinafter referred to as network 106. Wireless communication device 102 communicates with server 104 through test-bed 108. Thereafter, application 110 is installed on wireless communication device 102 interacts with server 104 through test-bed 108.

It will be apparent to one skilled in the art that test-bed 108 acts as an access point for wireless communication device 102. In one embodiment of the invention, test-bed 108 and server 104 are connected by a wired connection.

Test-bed 108 establishes a wireless connection with wireless communication device 102, thereafter, emulates one or more network conditions. The network conditions emulated by test-bed 108 are based on one or more testing parameters provided by a user. These testing parameters are explained in detail in conjunction with FIG. 3. Further, the network conditions emulated, based on the testing parameters, is communicated to wireless communication device 102 over network 106. Thereafter, wireless communication device 102 communicates with server 104 in the emulated network conditions, which enable testing of application 110. For example, the user testing application 110 provides the testing parameters to emulate 'weak network coverage'. Subsequently, the user tests application 110 in the weak network coverage emulated by test-bed 108. In such conditions, the user may note that application 110 hangs or reconnects with server 104 or switches to an alternative available network that is emulated by test-bed 108. In another exemplary embodiment, application 110, such as a video streaming player, may decrease or increase the frame rate, based on the emulated network conditions. In yet another exemplary embodiment, the user may also check the battery usage of wireless communication device 102 by application 110 in the emulated network conditions. Such observations made by the user results in successful testing of application 110.

Various examples of wireless communication device 102 include, but are not limited to, a mobile device, a Personal Digital Assistant (PDA), a laptop, a computer, a navigational device, and the like. Similarly, various examples of network 106 include, but are not limited to, a Bluetooth network, a General Packet Radio Service (GPRS), a Wireless Local Area Network (WLAN), 2.5G, 3G, and the like.

Various examples of application 110 include, but are not limited to, an Internet browser, a media-streaming player, an FM radio, a chatting application, and the like. In one embodiment of the invention, application 110 is a TCP/IP-based application. In another embodiment of the invention, application 110 can be a WAP-based application.

Figure 2:
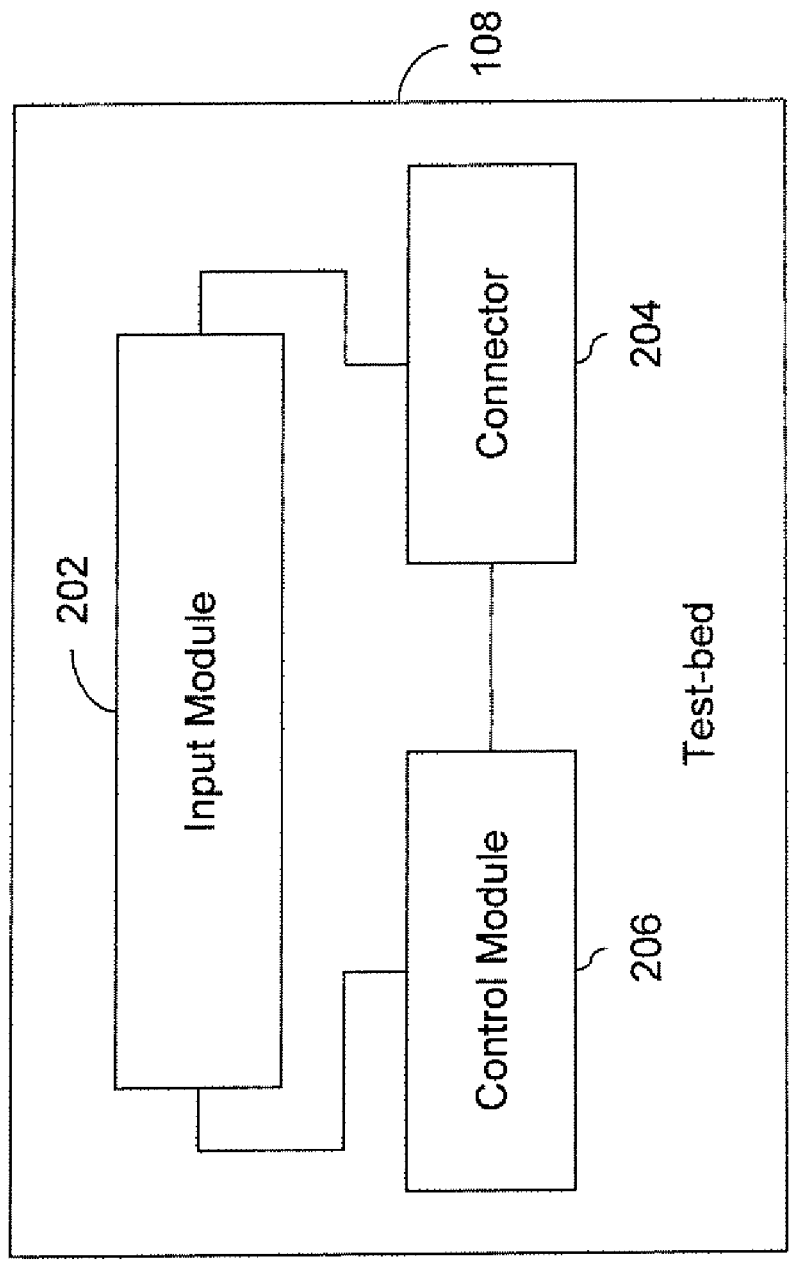
FIG. 2 is a block diagram of a test-bed, in accordance with an embodiment of the invention.

FIG. 2 is a block diagram of test-bed 108, in accordance with an embodiment of the invention. Test-bed 108 includes an input module 202, a connector 204 and a control module 206.

Input module 202 receives the testing parameters associated with network 106 from the user, to test application 110. Thereafter, connector 204 establishes a wireless connection between wireless communication device 102 and test-bed 108. Subsequently, control module 206 emulates one or more network conditions, based on the different testing parameters received through input module 202. The emulated network conditions are then communicated to wireless communication device 102 over network 106 through connector 204. Control module 206 communicates with the hardware drivers of connector 204, to emulate network conditions. Control module 206 is explained in detail in conjunction with FIG. 3.

Various examples of the testing parameters include, but not limited to, bandwidth, packet delay, packet loss, packet reordering, packet rescheduling, signal strength, signal amplitude, and the like. In one embodiment of the invention, input module 202 may be a graphical user interface (GUI).

In another embodiment of the invention, the testing parameters can be pre-defined for a test case. For example, for a particular preset test case, the number of testing parameters application 110 has to be tested can be pre-set in test-bed 108.

In one embodiment of the invention, there may be more than one connector in test-bed 108. The user can select one or more connectors, such as connector 204, from the various available connectors through input module 202. Various examples of connector 204 include, but not limited to, a WLAN interface, a Wi-Fi interface, and the like.

Subsequently, the user tests application 110 in the emulated network conditions. In an exemplary embodiment, the user tests application 110 for a GPRS network. A GPRS network typically has a bandwidth ranging between 56 kbps and 114 kbps. If users want to test application 110 at a bandwidth below 56 kbps, they set the bandwidth below 56 kbps through input module 202. Control module 206 emulates network conditions, which correspond to a bandwidth that is less than 56 kbps. Thereafter, control module 206 communicates the emulated network conditions to wireless communication device 102 through connector 204. Application 110 is executed under the emulated network conditions. The user checks the behaviour and performance of application 110 in the emulated network conditions. For instance, application 110 either gets hung at a bandwidth below 56 kbps or tries to reconnect with server 104 after a pre-defined period of time, or switches to an alternative available network that is emulated by test-bed 108. In another exemplary embodiment, application 110, such as a video-streaming player, may decrease or increase the frame rate, based on the emulated network conditions. In yet another exemplary embodiment, the user may check the battery usage of wireless communication device 102 by application 110 in the emulated network conditions. Thereby, the user completes the process of testing application 110 by observing the behavior of application 110.

Similarly, application 110 can be tested for various other testing parameters such as packet delay, packet loss, signal strength, and so forth.

In various embodiments of the invention, test-bed 108 includes a memory for storing testing parameters. Further, test-bed 108 includes a processor, which performs various computations to emulate various network conditions.

Figure 3:
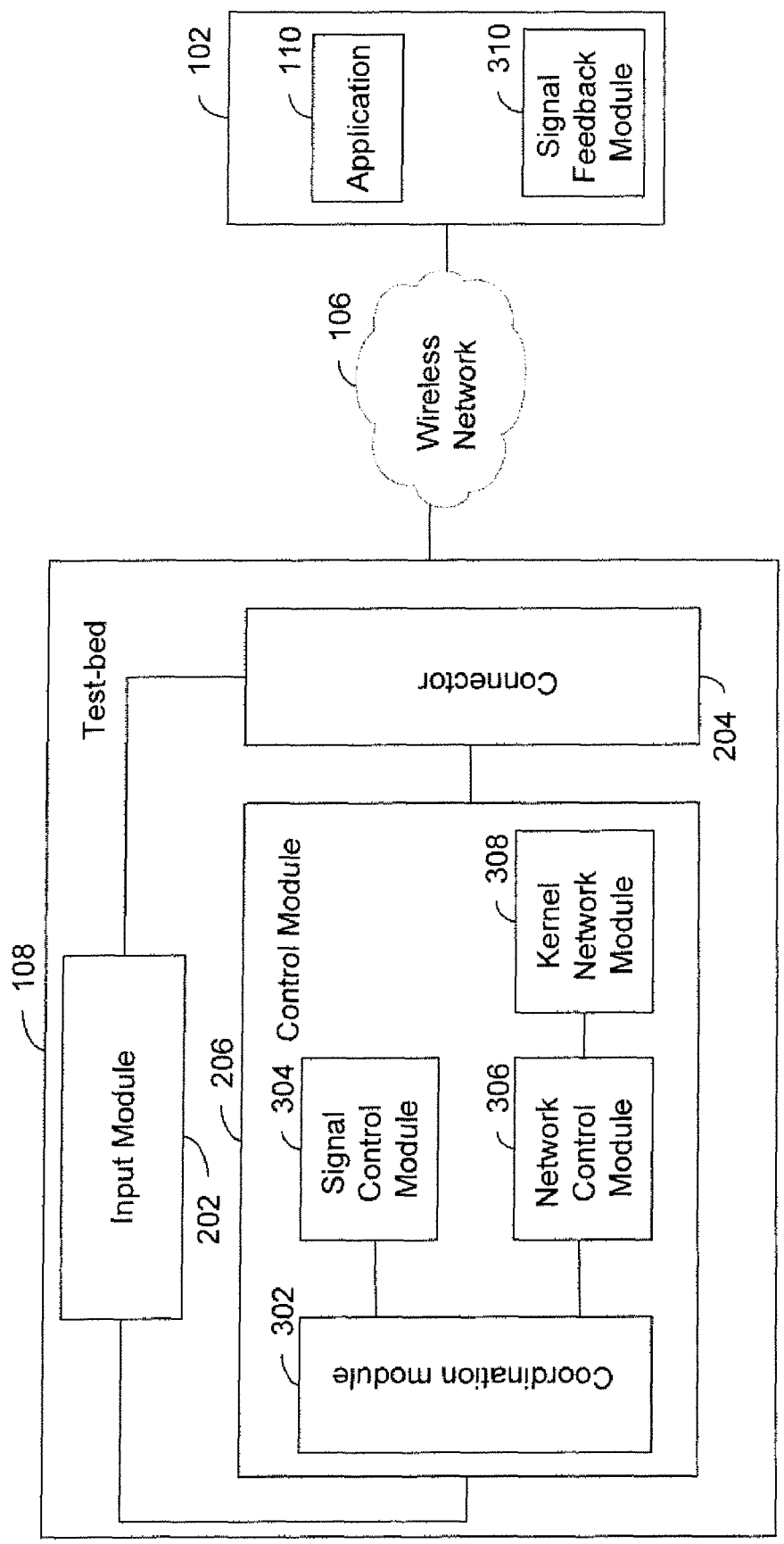
FIG. 3 is a block diagram of the test-bed, in accordance with another embodiment of the invention.

FIG. 3 is a block diagram of test bed 108, in accordance with another embodiment of the invention. Test-bed 108 includes input module 202, connector 204 and control module 206. Control module 206 includes a coordination module 302, a signal control module 304, a network control module 306, and a kernel network module 308. Wireless communication device 102 includes application 110 and a signal feedback module 310.

As explained in FIG. 2, wireless communication device 102 communicates with server 104 over network 106 through test-bed 108.

Input module 202 receives various testing parameters from the user. After receiving the testing parameters, input module 202 communicates the testing parameters to coordination module 302. Coordination module 302 then interacts with signal control module 304, network control module 306 and kernel network module 308, based on the testing parameters. Signal control module 304 and kernel network module 308 emulate various network conditions on the basis of the communicated testing parameters. Thereafter, the emulated network conditions are communicated to wireless communication device 102 through connector 204.

In one embodiment of the invention, the testing parameters include network parameters and signal parameters. Various examples of the network parameters include, but not limited to, bandwidth, packet delay, packet loss, packet reordering, packet rescheduling, and the like. Similarly, various examples of the signal parameters include, but not limited to, signal strength, signal amplitude, and the like.

In another embodiment of the invention, the network parameters and the signal parameters can be pre-defined for a test-case. For example, for a particular test case, the number of the network parameters and the signal parameters can be pre-set in the test-bed 108.

In addition to receiving the network parameters and the signal parameters, input module 202 receives values that correspond to each of the network parameters and the signal parameters. An example of the corresponding values of the network parameters may include, but may not be limited to, 40 kbps for bandwidth, 2 milliseconds for delay of packets, and the like. Similarly, various examples of the values corresponding to the signal parameters may include, but are not limited to, weak signal strength, strong signal strength, and the like. In one embodiment of the invention, the values corresponding to the network parameters and signal parameters are provided by the user.

In another embodiment of the invention, the values corresponding to the network and signal parameters can be pre-defined. For example, there may be pre-set profiles, such as a tunnel profile, a roaming profile, a basement profile, and the like, in test-bed 108. If a user wishes to test the application for the tunnel profile, test-bed 108 will automatically set a weak signal strength and low bandwidth in the tunnel profile. Similarly, there are values pre-set for the various network parameters and signal parameters associated with the corresponding profiles.

Input module 202 communicates the network parameters and the signal parameters, with their corresponding values, to coordination module 302. Subsequently, coordination module 302 coordinates between signal control module 304 and network control module 306, based on the communicated signal parameters and network parameters.

Coordination module 302 configures the signal parameters, based on the corresponding values of the signal parameters received from the user through input module 202. Thereafter, coordination module 302 communicates the configured signal parameters to signal control module 304. For example, the user provides a value as 'weak', which corresponds to the signal strength. Coordination module 302 configures the signal strength to 'weak' and communicates the configured signal strength to signal control module 304. Thereafter, signal control module 304 emulates the weak network conditions, based on the configured signal strength. The emulated network conditions, based on the configured signal strength, are then communicated to wireless communication device 102 over network 106 through connector 204. The user tests application 110, on the basis of the emulated network conditions. For instance, application 110 either gets hung due to weak signal strength, or tries to reconnect with server 104 after a pre-defined period of time, or switches to an alternative available network that is emulated by test-bed 108. In another exemplary embodiment, application 110, such as a video-streaming player, may decrease or increase the frame rate, based on the emulated network conditions. In yet another exemplary embodiment, the user may also check the battery usage of wireless communication device 102 by application 110 in the emulated network conditions. Thereby, by observing this behavior of application 110, the user completes the process of testing application 110.

Coordination module 302 also configures various other signal parameters and communicates the configured signal parameters to signal control module 304, to emulate different network conditions. The emulated network conditions are communicated to connector 204 by signal control module 304. Accordingly, connector 204 communicates the emulated network conditions to wireless communication device 102. It will be apparent to one skilled in the art that connector 204 transmits the network conditions through a transmitter or a transceiver that is embedded in test-bed 108.

Further, coordination module 302 receives feedback from signal feedback module 310, which is embedded in wireless communication device 102. Signal feedback module 310 constantly sends feedback on the network conditions emulated, based on the signal parameters. Based on the feedback received from signal feedback module 310, coordination module 302 reconfigures the signal parameters. For example, if the user wishes to test application 110 for a pre-defined range of signal strength, signal feedback module 310 constantly provides feedback on the signal strength. If the signal strength deviates from the pre-defined range, coordination module 302 reconfigures the signal strength within the pre-defined range. In one embodiment of the invention, the pre-defined range can be provided by the user through input module 202. It will be apparent to one skilled in the art that coordination module 302 receives feedback on the signal parameters from signal feedback module 310 that is embedded in wireless communication device 102 through a receiver or transceiver embedded in test-bed 108.

In another embodiment of the invention, there can be more than one connector in test-bed 108. Further, each of the one or more connectors is associated with a corresponding signal control module. For example, connector 204 is associated with signal control module 304. Coordination module 302 configures the signal parameters and synchronously communicates the configured signal parameters to the signal control modules associated with the corresponding connectors.

In an exemplary embodiment, the user may want to test the performance of application 110 while wireless communication device 102 is moving out of a first network provided by a first access point to a second network, which is provided by a second access point. It will be apparent to one skilled in the art that the signal strength provided by the first access point will decrease, and simultaneously, the signal strength provided by the second access point will increase without loosing connectivity. To replicate such a network condition, coordination module 302 configures the signal parameters for the two signal control modules associated with the corresponding connectors. To explain this further, if there is a first signal control module associated with a first connector and a second signal control module associated with a second connector in test-bed 108, coordination module 302 decreases the signal strength and communicates the decreased signal strength to the first signal control module, while simultaneously increasing the signal strength, and communicates the increased signal strength to the second signal control module. Accordingly, the network conditions emulated by the first signal control module and the second control module in test-bed 108 are communicated to wireless communication device 102 through their respective connectors.

In yet another embodiment of the invention, the testing conditions mentioned above can be also achieved by using two test-beds. These two test-beds interact with each other and emulate the network conditions, based on the signal parameters provided by the user. The coordination module associated with each test-bed coordinates synchronously between the two test-beds and configures the signal parameters accordingly. It will be apparent to one skilled in the art that the coordination module associated with a first test-bed decreases the signal strength and the coordination module associated with a second test-bed increases the signal strength simultaneously.

In addition to the signal parameters, coordination module 302 also receives the network parameters and their corresponding values through input module 202. Coordination module 302 communicates the network parameters and their corresponding values to network control module 306.

Network control module 306 configures the network parameters, based on their corresponding values. For example, the user wants to test application 110 for bandwidth in a GPRS network that has a bandwidth ranging between 56 kbps and 114 kbps. In an exemplary test case, the user provides a bandwidth value of below 56 kbps, such as, for example, 40 kbps, through input module 202. Network control module 306 then configures the bandwidth value as 40 kbps. It will be apparent to one skilled in the art that configuration of the network parameters may involve dropping of packets, rescheduling packets, and so forth.

Network control module 306 communicates the configured bandwidth to kernel network module 308. Thereafter, kernel network module 308 emulates network conditions, based on the configured bandwidth, and communicates the emulated network conditions to wireless communication device 102. It will be apparent to one skilled in the art that connector 204 transmits the network conditions through the transmitter or the transceiver embedded in test-bed 108.

Subsequently, application 110 is executed under the emulated network conditions. The user checks the behavior and performance of application 110 and completes the process of testing application 110. It will be apparent to one skilled in the art that by reducing the bandwidth value, various other network parameters will vary accordingly, for example, packet delay, packet loss, and the like.

Network control module 306 also configures various other network parameters such as packet delay, packet loss. For example, if the user wishes that the packets of network 106 are delayed by two milliseconds, network control module 306 configures the packets accordingly after applying the delay time of 2 milliseconds. Network control module 306 then communicates the configured packets to kernel network module 308, to emulate the corresponding network conditions. The user tests application 110 in the emulated network conditions.

In one embodiment of the invention, network control module 306 and kernel network module 308 function, based on the TCP/IP protocol. In another embodiment of the invention, network control module 306 and kernel network module 308 can function, based on the WAP protocol.

In another embodiment of the invention, application 110 can be tested when there is more than one connector in test-bed 108. Further, each of the one or more connectors is associated with a corresponding network control module. For example, connector 204 is associated with network control module 306. Coordination module 302 synchronously communicates the network parameters and their corresponding values to each network control module associated with the corresponding connectors selected by the user. Thereafter, the network control module associated with the corresponding connector configures the network parameters and communicates the configured network parameters to kernel network module 308.

In an exemplary embodiment, the user may want to test the performance of application 110 while wireless communication device 102 is moving out of a first network provided by a first access point to a second network, which is provided by a second access point. It will be apparent to one skilled in the art that the network coverage provided by the first access point will decrease, and simultaneously, the network coverage provided by the second access point will increase, without losing connectivity. To replicate such a network condition, coordination module 302 synchronously communicates the network parameters and their corresponding values to two network control modules associated with the corresponding connectors. To explain this further, if there is a first network control module associated with a first connector, and a second network control module associated with a second connector in test-bed 108, the first network control module configures the network parameters to reduce network coverage of the first network, and the second network control module configures the network parameters to increase the network coverage of the second network. Thereafter, the first network control module and the second network control module communicate the configured network parameters to kernel network module 308. Subsequently, kernel network module 308 emulates two different network conditions, based on the configured network parameters received from the first network control module and the second network control module. Accordingly, the network conditions emulated by kernel network module 308 are communicated to wireless communication device 102 through their respective connectors.

In yet another embodiment of the invention, the testing conditions mentioned above can also be achieved by using two test-beds. The two test-beds interact with each other and emulate network conditions, based on the network parameters provided by the user. The coordination module associated with each test-bed synchronously communicates the network parameters and their corresponding values to the corresponding network control modules associated with the connectors.

In one embodiment of the invention, testing can be performed for either the signal parameters or the network parameters, or a combination of both.

In another embodiment of the invention, input module 202, control module 206, coordination module 302, signal control module 304, network control module 306, kernel network module 308 and signal feedback module 310 can be implemented as software programs.

Figure 4:
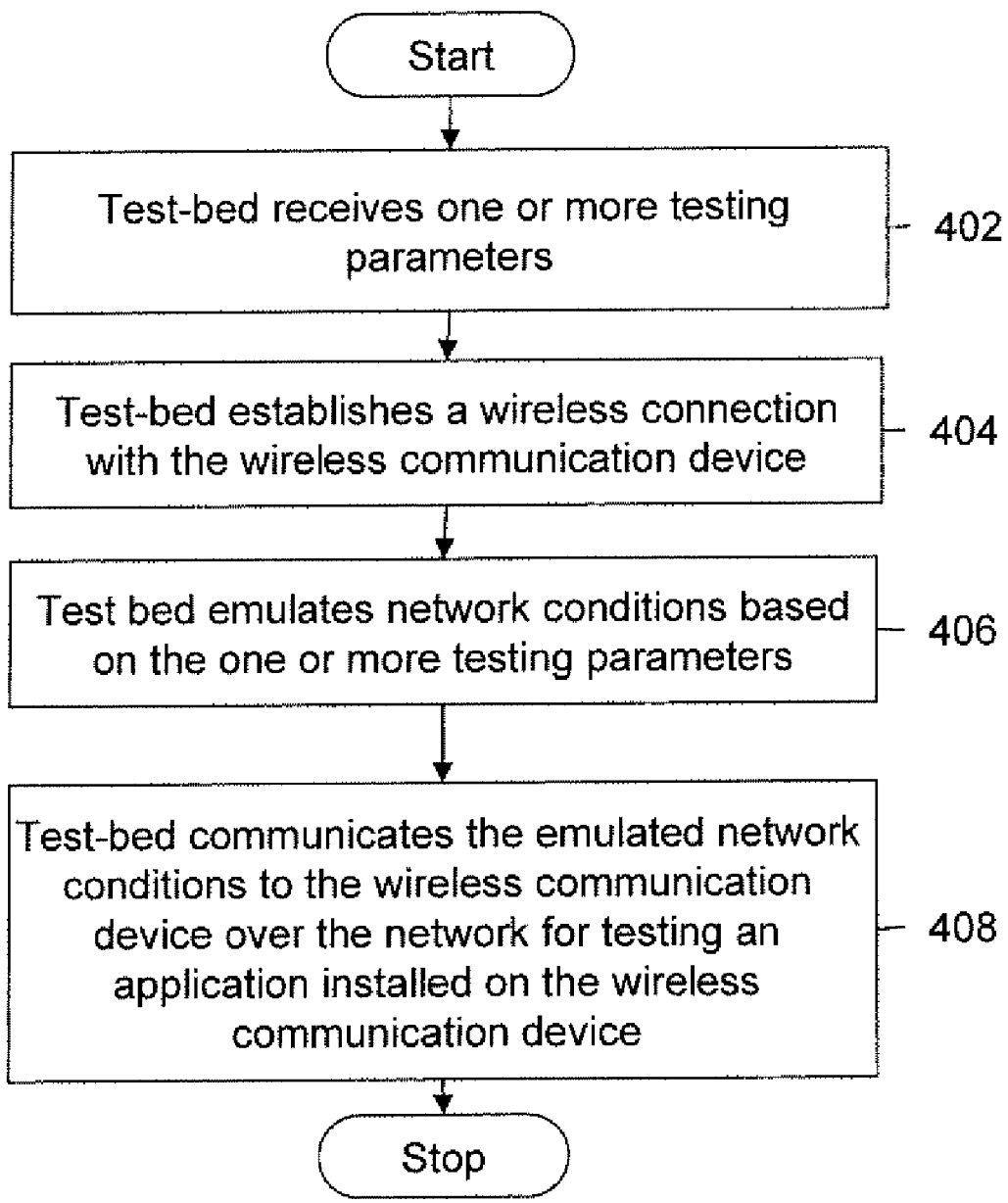
FIG. 4 is a flowchart of a method for testing an application installed on a wireless communication device, in accordance with an embodiment of the invention.

FIG. 4 is a flowchart of a method for testing an application such as application 110, installed on a wireless communication device such as wireless communication device 102, in accordance with an embodiment of the invention. In various embodiments of the invention, the wireless communication device communicates with a server such as server 104 over a wireless network such as wireless network 106 through a test-bed such as test-bed 108. The wireless network is hereinafter referred to as the network. The test-bed is connected with the server. In one embodiment of the invention, the connection between the server and the test-bed is a wired connection.

At 402, the test-bed receives one or more testing parameters from the user. Various examples of testing parameters include, but not limited to, bandwidth, packet delay, packet loss, packet re-ordering, packet rescheduling, signal strength, signal amplitude, and the like. The testing parameters are explained in detail in conjunction with FIG. 5. In another embodiment of the invention, the testing parameters can be pre-defined for a test case. For example, for a particular pre-set test-case, the number of testing parameters can be pre-set in the test-bed.

At 404, the test-bed establishes a wireless connection with the wireless communication device, which communicates with the server over the network through the test-bed. Various examples of the wireless communication device include, but are not limited to, a mobile device, a PDA, a laptop, a computer, a navigational device, and the like. Various examples of the network include, but are not limited to, a Bluetooth network, a General Packet Radio Service (GPRS), a Wireless Local Area Network (WLAN), 2.5G, 3G, and the like.

At 406, the test-bed emulates network conditions, based on the testing parameters received from the user. For example, if the user provides a testing parameter to emulate 'weak' network conditions, the test-bed emulates the weak network conditions, based on the testing parameter provided by the user. Emulation of network conditions is explained in detail in conjunction with FIG. 3.

At 408, the test-bed communicates the emulated network conditions over the network to the wireless communication device. The emulated network conditions are experienced by the application installed on the wireless communication device. Subsequently, the user checks the performance and behavior of the application in the emulated network conditions. For example, the application may either get hung, or may try to reconnect to the server after a pre-defined interval of time, or may switch to an alternative available network that is emulated by the test-bed. In another exemplary embodiment, the application, for example, a video-streaming player may decrease or increase the frame rate, based on the emulated network conditions. In yet another exemplary embodiment, the user may also check the battery usage of the wireless communication device by the application in the emulated network conditions. Such observations made by the user results in the application being tested.

Various examples of the application include, but are not limited to, an Internet browser, a media-streaming player, an FM radio, a chatting application, and the like. In one embodiment of the invention, the application is a TCP/IP protocol-based application. In another embodiment of the invention, the application can be a Wireless Application Protocol (WAP)-based application.

Figure 5A:
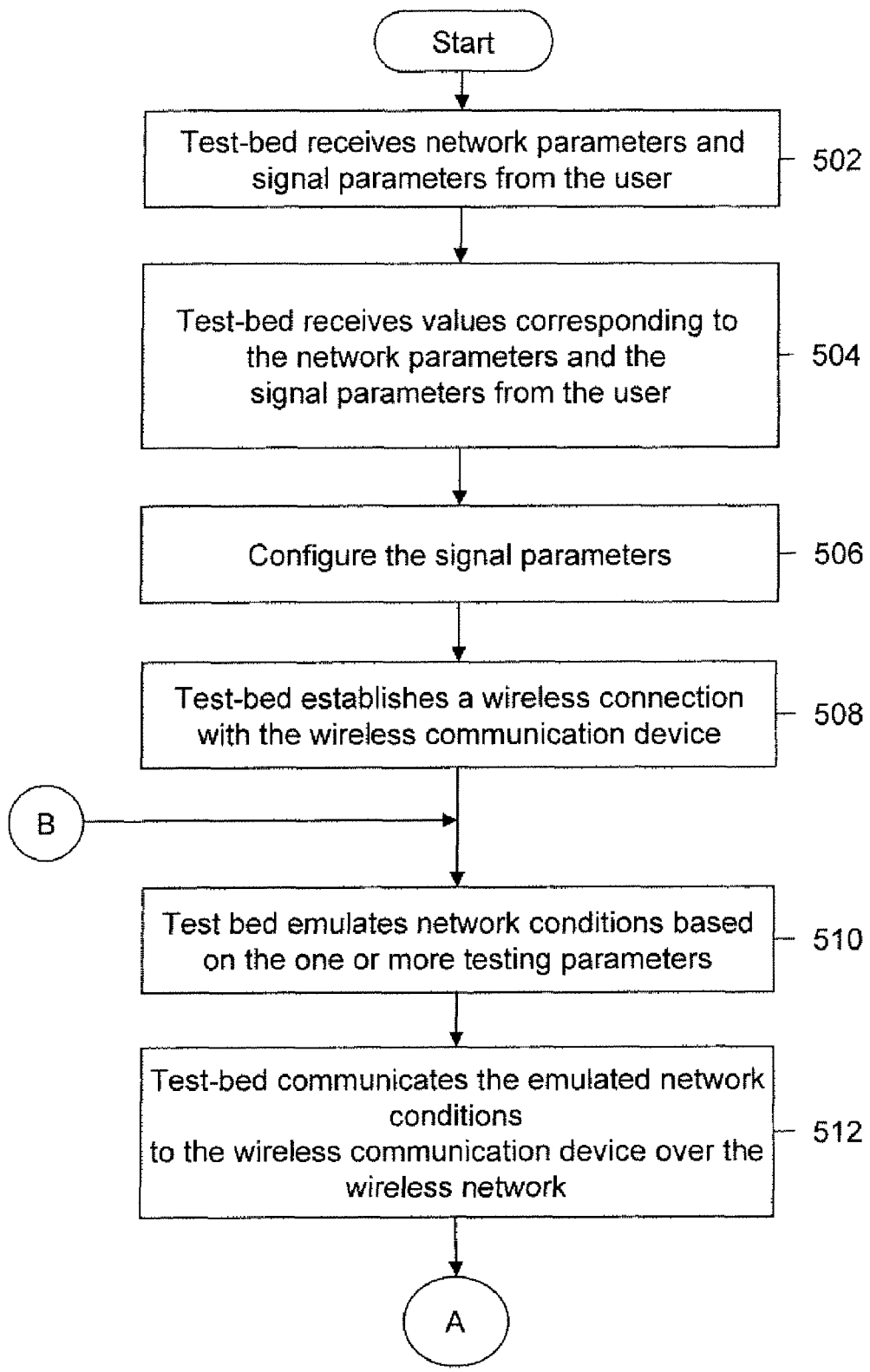
FIGS. 5a and 5b is a flowchart illustrating a method for testing the application installed on the wireless communication device, in accordance with another embodiment of the invention.
Figure 5B:
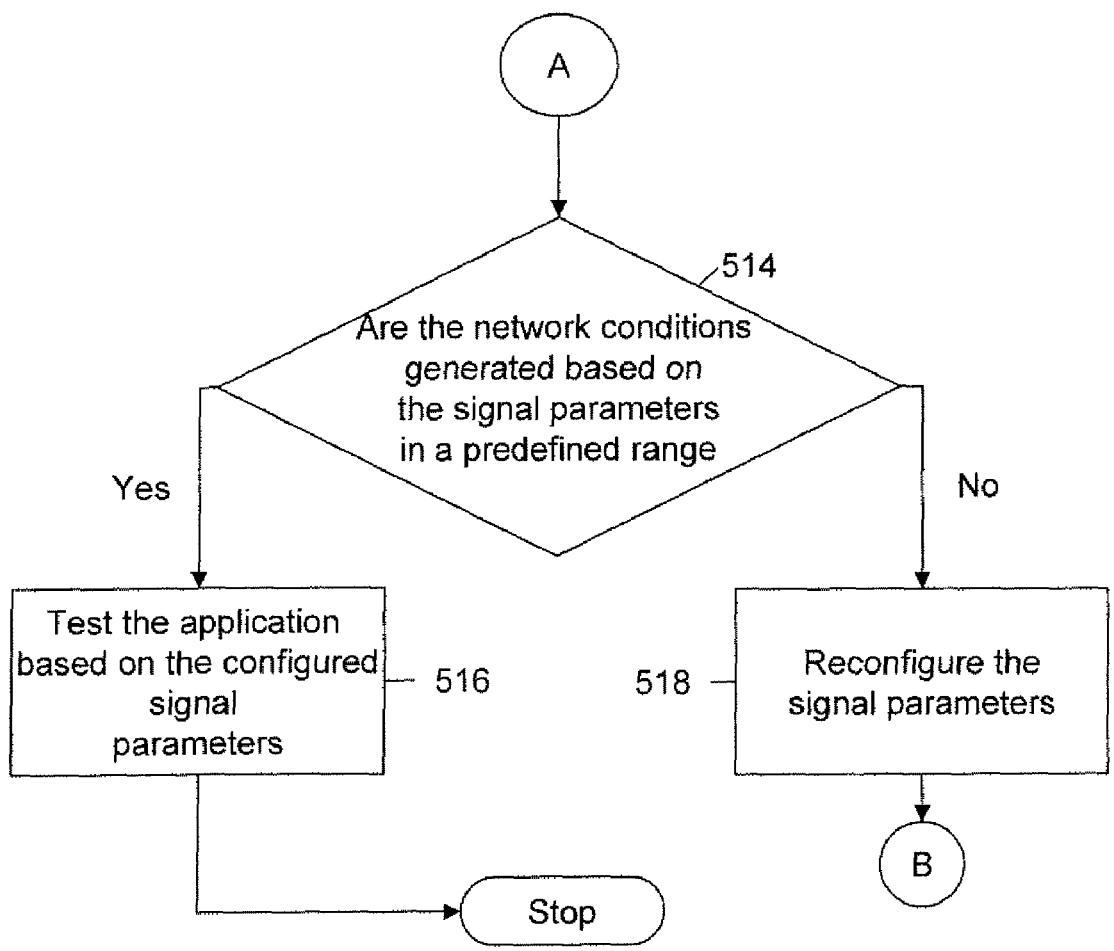

FIG. 5 is a flowchart illustrating a method for testing the application installed on the wireless communication device, in accordance with another embodiment of the invention. In various embodiments of the invention, the wireless communication device communicates with the server over the network through the test-bed. The test-bed is connected to the server.

At 502, the test-bed receives one or more network parameters and signal parameters from the user. Various examples of the network parameters include, but are not limited to, bandwidth, packet delay, packet loss, packet rescheduling, packet reordering, and the like. Similarly, various examples of the signal parameters include, but are not limited to, signal strength, signal amplitude, and the like.

In another embodiment of the invention, the network parameters and the signal parameters can be pre-defined for a test case. For example, for a particular pre-set test case, the number of network parameters and signal parameters can be pre-set in the test-bed.

At 504, the test-bed receives values from the user that correspond to the network parameters and the signal parameters. For example, bandwidth can have a value of 40 kbps, packet delay can be set as 10 milliseconds, and so forth. Similarly, examples of signal strength can have values such as weak, strong, ON, OFF, and the like.

In yet another embodiment of the invention, the values corresponding to the network and the signal parameters can be predefined. For example, there may be pre-set profiles, such as a tunnel profile, a roaming profile, a basement profile, and so forth, in the test-bed. If the user wishes to test the application for the tunnel profile, the test-bed will automatically set a weak signal strength and low bandwidth in the tunnel profile. Similarly, there can be values preset for the various network parameters and signal parameters associated with the corresponding profiles.

Once the test-bed has received the network parameters and the signal parameters with their corresponding values, the test-bed configures the network parameters and the signal parameters, based on their corresponding values, at 506. For example, the user wishes to test the application for bandwidth in a GPRS network, which typically ranges between 56 kbps and 114 kbps. In an exemplary test case, the user provides a bandwidth value of below 56 kbps, such as, for example, 40 kbps. Thereafter, the test-bed configures the bandwidth equivalent to 40 kbps. It will be apparent to one skilled in the art that the configuration of the network parameters involves dropping and rescheduling packets, and the like.

The test-bed also configures the signal parameters, based on the values that correspond to the signal parameters. For example, if the user provides a value that is 'weak' that corresponds to the signal strength, the test-bed configures the signal strength as 'weak'.

Thereafter, at 508, the test-bed establishes a wireless connection with the wireless communication device, which communicates with the server over the network through the test-bed. At 510, the test-bed emulates network conditions, based on the configured network parameters and signal parameters. As described in the example at 506, mentioned above, the test-bed now emulates network conditions, based on the configured bandwidth that is equivalent to 40 kbps and the 'weak' signal strength.

Subsequently, at 512, the test-bed communicates the emulated network conditions to the wireless communication device over the network. At 514, the wireless communication device performs a check to determine whether the network conditions generated, based on the signal parameters, are in a pre-defined range. For example, if the user wishes to test an application for a predefined range of signal strength, the wireless communication device constantly provides feedback on the signal strength. In an embodiment of the invention, the predefined range can be provided by the user.

If the signal parameters are found in the predefined range, based on the feedback, the user tests the application in the emulated network conditions at 516. For example, the user either notes that the application gets hung, or tries to reconnect it to the server, or switches to an alternative available network, emulated by the test-bed. In another exemplary embodiment, the application, such as a video-streaming player, may decrease or increase the frame rate, based on the emulated network conditions. In yet another exemplary embodiment, the user may also check the battery usage of the wireless communication device by the application in the emulated network conditions. Such observations made by the user complete the process of testing the application.

If the signal parameters are not found in the pre-defined range at 514, the test-bed reconfigures the signal parameters at 518, based on the feedback. Thereafter, the test-bed emulates the network conditions, based on the reconfigured signal parameters. Subsequently, the user can perform testing in the emulated network conditions.

In one embodiment of the invention, testing can be performed for either the signal parameters or the network parameters, or a combination of both.

The test-bed and the method described above have a number of advantages. The test-bed enables the user to test the application installed on the wireless communication device. Further, since the application is installed on the wireless communication device, the application experiences the hardware and software environment of the wireless communication device while it is being tested. Hence, this eliminates the possibility of the application behaving abnormally once it is installed on the wireless communication device.

Furthermore, the test-bed emulates various network conditions, based on different testing parameters. A user testing the application can perform the test in various network conditions, which results in the application being tested rigorously. This eliminates the problems experienced in field testing.

Thereby, the test-bed enables the user to test the application repeatedly for the testing parameters. The test-bed also provides various features such as manual and automatic testing. Further, multiple test-beds can be used to test the application in various network conditions.

The test-bed for testing an application installed on a wireless communication device, as described in the present invention or any of its components, may be embodied in the form of a computer system. Typical examples of a computer system includes a general-purpose computer, a programmed microprocessor, a micro-controller, a peripheral integrated circuit element, and other devices or arrangements of devices that are capable of implementing the steps that constitute the method of the present invention.

The computer system comprises a computer, an input device, a display unit and the Internet. The computer comprises a microprocessor, which is connected to a communication bus. The computer also includes a memory, which may include a Random Access Memory (RAM) and a Read Only Memory (ROM). Moreover, the computer system comprises a storage device, which can be a hard disk drive or a removable storage drive such as a floppy disk drive, an optical disk drive, etc. The storage device can be means for loading computer programs or other instructions into the computer system. The computer system includes a communication unit, which enables the computer to connect to other databases and the Internet through an I/O interface. The communication unit enables the transfer and reception of data from other databases and may include a modem, an Ethernet card, or any other similar device that enables the computer system to connect to databases and networks such as LAN, MAN, WAN and the Internet. The computer system facilitates inputs from a user through an input device that is accessible to the system through an I/O interface.

The computer system executes a set of instructions that are stored in one or more storage elements, to process input data. The storage elements may also hold data or other information, as desired, and may be in the form of an information source or a physical memory element present in the processing machine.

The set of instructions may include various commands that instruct the processing machine to perform specific tasks such as the steps that constitute the method of the present invention. The set of instructions may be in the form of a software program. The software may be in the form of a collection of separate programs, a program module with a larger program, or a portion of a program module, as in the present invention. The software may also include modular programming in the form of object-oriented programming. Processing of input data by the processing machine may be in response to users' commands, the result of previous processing, or a request made by an alternative processing machine.

While the preferred embodiments of the invention have been illustrated and described, it will be clear that the invention is not limited to these embodiments only. Numerous modifications, changes, variations, substitutions and equivalents will be apparent to those skilled in the art, without departing from the spirit and scope of the invention, as described in the claims.

The invention claimed is:

1. A test-bed for testing an application installed on a wireless communication device, the wireless communication device communicating with a server over a network through the test-bed, the test-bed connected with the server, the test-bed comprising:
   a. an input module, the input module configured for receiving one or more testing parameters from a user;
   b. at least one connector, the at least one connector configured for establishing a wireless connection between the test-bed and the wireless communication device, the at least one connector being selected by the user through the input module; and
   c. a control module, the control module configured for emulating one or more network conditions of the network based on the one or more testing parameters, wherein the one or more emulated network conditions are communicated to the wireless communication device through the at least one connector for facilitating the testing of the application.

2. The test-bed according to claim 1, wherein the input module is further configured for receiving one or more values corresponding to each of the one or more testing parameters, the one or more values being provided by the user.

3. The test-bed according to claim 2, wherein the control module comprises a coordination module, the coordination module configured for receiving the one or testing parameters from the input module.

4. The test-bed according to claim 3, wherein the control module further comprises at least one signal control module, the at least one signal control module configured for emulating the one or more network conditions based on one or more signal parameters received from the coordination module.

5. The test-bed according to claim 4, wherein the coordination module is further configured for configuring the one or more signal parameters for the at least one signal control module, the one or more signal parameters being at least one of the one or more testing parameters.

6. The test-bed according to claim 3, wherein the coordination module interacts with a signal feedback module embedded in the wireless communication device, the signal feedback module configured for providing a feedback for at least one of the one or more signal parameters to the coordination module.

7. The test-bed according to claim 3, wherein the control module further comprises at least one network control module, the at least one network control module configured for configuring one or more network parameters, wherein the one or more network parameters are received from the coordination module, the one or more network parameters being at least one of the one or more testing parameters.

8. The test-bed according to claim 7, wherein the control module further comprises a kernel network module, the kernel network module configured for emulating the one or more network conditions based on the one or more configured network parameters.

9. A method for testing an application installed on a wireless communication device, the wireless communication device communicating with a server over a network through the test-bed, the server being connected with the test-bed, the method comprising:
   a. receiving one or more testing parameters from a user, wherein the one or more testing parameters are received by the test-bed;
   b. establishing a wireless connection between the test-bed and the wireless communication device, wherein the wireless connection being established by the test-bed;
   c. emulating one or more network conditions of the network based on the one or more testing parameters, the one or more network conditions being emulated by the test-bed; and
   d. communicating the one or more emulated network conditions to the wireless communication device through the test-bed, wherein the emulated one or more network conditions facilitates testing of the application.

10. The method according to claim 9 further comprising receiving one or more values corresponding to each of the one or more testing parameters.

11. The method according to claim 10 further comprising configuring the one or more testing parameters based on the one or more received values.

12. The method according to claim 10, wherein the one or more testing parameters comprising at least one of one or more network parameters.

13. The method according to claim 10, wherein the one or more testing parameters comprising at least one of one or more signal parameters.

14. The method according to claim 13 further comprising providing a feedback for at least one of the one or more signal parameters to the test-bed, the feedback being provided by the wireless communication device.

15. A computer program product for use with a computer, the computer program product comprising a computer usable medium having a computer readable program code embodied therein for testing performance of an application installed on a wireless communication device, the wireless communication device communicating with a server over a network through the test-bed, the server being connected with the test-bed, the computer readable program code performing:
   a. receiving one or more testing parameters from a user, wherein the one or more testing parameters are received by the test-bed;
   b. establishing a wireless connection between the test-bed and the wireless communication device, wherein the wireless connection is established by the test-bed;
   c. emulating one or more network conditions of the network based on the one or more testing parameters, the one or more network conditions being emulated by the test-bed; and
   d. communicating the one or more emulated network conditions to the wireless communication device through the test-bed, wherein the emulated one or more network conditions facilitates testing of the application.

16. The computer program product according to claim 15, wherein the computer readable program code further performs receiving one or more values corresponding to each of the one or more testing parameters.

17. The computer program product according to claim 16 wherein the computer readable program code further performs configuring the one or more testing parameters based on the one or more received values.

18. The computer program product according to claim 16, wherein the computer readable program code further performs receiving a feedback for at least one of one or more signal parameters to the test-bed, the feedback being provided by the wireless communication device, the one or more signal parameters being at least one of the one or more testing parameters.

* * * * *

UNITED STATES PATENT AND TRADEMARK OFFICE
CERTIFICATE OF CORRECTION

| | | |
|---|---|---|
| PATENT NO. | : 8,028,188 B2 | Page 1 of 1 |
| APPLICATION NO. | : 12/395876 | |
| DATED | : September 27, 2011 | |
| INVENTOR(S) | : Balaji Dhanapal Karthikeyan et al. | |

It is certified that error appears in the above-identified patent and that said Letters Patent is hereby corrected as shown below:

Column 2, line 50, "is a flowchart" should read --are flowcharts--.
Column 3, line 14, after 110, insert --which--.
Column 3, line 27, "is" should read --are--.
Column 4, line 8, after "but" insert --are--.
Column 4, line 21, after "but" insert --are--.
Column 5, line 12, after "but" insert --are--.
Column 5, line 15, after "but" insert --are--.
Column 7, line 57, "function," should read --function--.
Column 7, line 60, "function," should read --function--.
Column 8, line 67, after "but" insert --are--.
Column 9, line 41, "results" should read --result--.
Column 11, line 32, "includes" should read --include--.
Column 12, line 41, "or testing" should read --or more testing--.
Column 13, line 14, "being" should read --is--.
Column 13, line 22, "facilitates" should read --facilitate--.
Column 13, line 30, "comprising" should read --comprise--.
Column 13, line 33, "comprising" should read --comprise--.
Column 14, line 22, "facilitiates" should read --facilitate--.

Signed and Sealed this
Twentieth Day of November, 2012

David J. Kappos
*Director of the United States Patent and Trademark Office*